(12) United States Patent
Porte

(10) Patent No.: US 6,334,730 B1
(45) Date of Patent: Jan. 1, 2002

(54) TELESCOPIC ROD FOR OPENING A MOBILE COWL, IN PARTICULAR OF AN AIRCRAFT ENGINE BAY

(75) Inventor: Alain Porte, Colomiers (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/297,745

(22) PCT Filed: Nov. 26, 1998

(86) PCT No.: PCT/FR98/02534

§ 371 Date: Jun. 21, 2000

§ 102(e) Date: Jun. 21, 2000

(87) PCT Pub. No.: WO99/28187

PCT Pub. Date: Jun. 10, 1999

(30) Foreign Application Priority Data

Nov. 27, 1997 (FR) .................................... 97 14934

(51) Int. Cl.[7] ....................................................... B64C 7/02
(52) U.S. Cl. .................... 403/104; 244/53 R; 244/129.5; 403/109.1; 403/109.7; 403/322.2
(58) Field of Search ................................. 403/104, 109.1, 403/109.2, 109.3, 109.5, 109.7, 322.2, 322.3, 377, 322.1; 244/129.5, 53 R

(56) References Cited

U.S. PATENT DOCUMENTS

| 1,598,868 | A | * | 9/1926 | Lundelius |
| 2,178,998 | A | * | 11/1939 | Scott |
| 2,229,506 | A | * | 1/1941 | Johnson |
| 2,235,496 | A | * | 3/1941 | Greig |
| 4,629,146 | A | * | 12/1986 | Lymons |
| 4,825,644 | A | | 5/1989 | Bubello et al. |
| 5,046,689 | A | * | 9/1991 | Shine |
| 5,289,615 | A | * | 3/1994 | Banks et al. |
| 5,544,449 | A | * | 8/1996 | Amelio et al. |
| 5,593,239 | A | * | 1/1997 | Sallee |
| 5,667,169 | A | * | 9/1997 | Erben ........................ 244/129.5 |
| 6,170,253 | B1 | * | 1/2001 | Newton |

FOREIGN PATENT DOCUMENTS

| DK | 33 37 297 | | 5/1985 |
| EP | 0 393 259 | | 10/1989 |
| FR | WO 96/01064 | * | 1/1996 |
| WO | WO 96/01064 | | 1/1996 |

* cited by examiner

Primary Examiner—Lynne H. Browne
Assistant Examiner—Tomlyne A Malcolm
(74) Attorney, Agent, or Firm—Burns Doane Swecker & Mathis LLP

(57) ABSTRACT

A bar (25) for holding open a cover (4) hinged on the nacelle enclosing an aircraft engine (7) comprises two sections (26 and 28) of unequal length, one of which is hinged (27) on the cover (4) and the other (30) on the engine (7). The mechanism for locking or unlocking the sections (26 and 28) is controlled by a handle adjacent to the cover hinge (27). The bar can therefore be controlled by the very operator who is responsible for raising the cover (4).

7 Claims, 8 Drawing Sheets

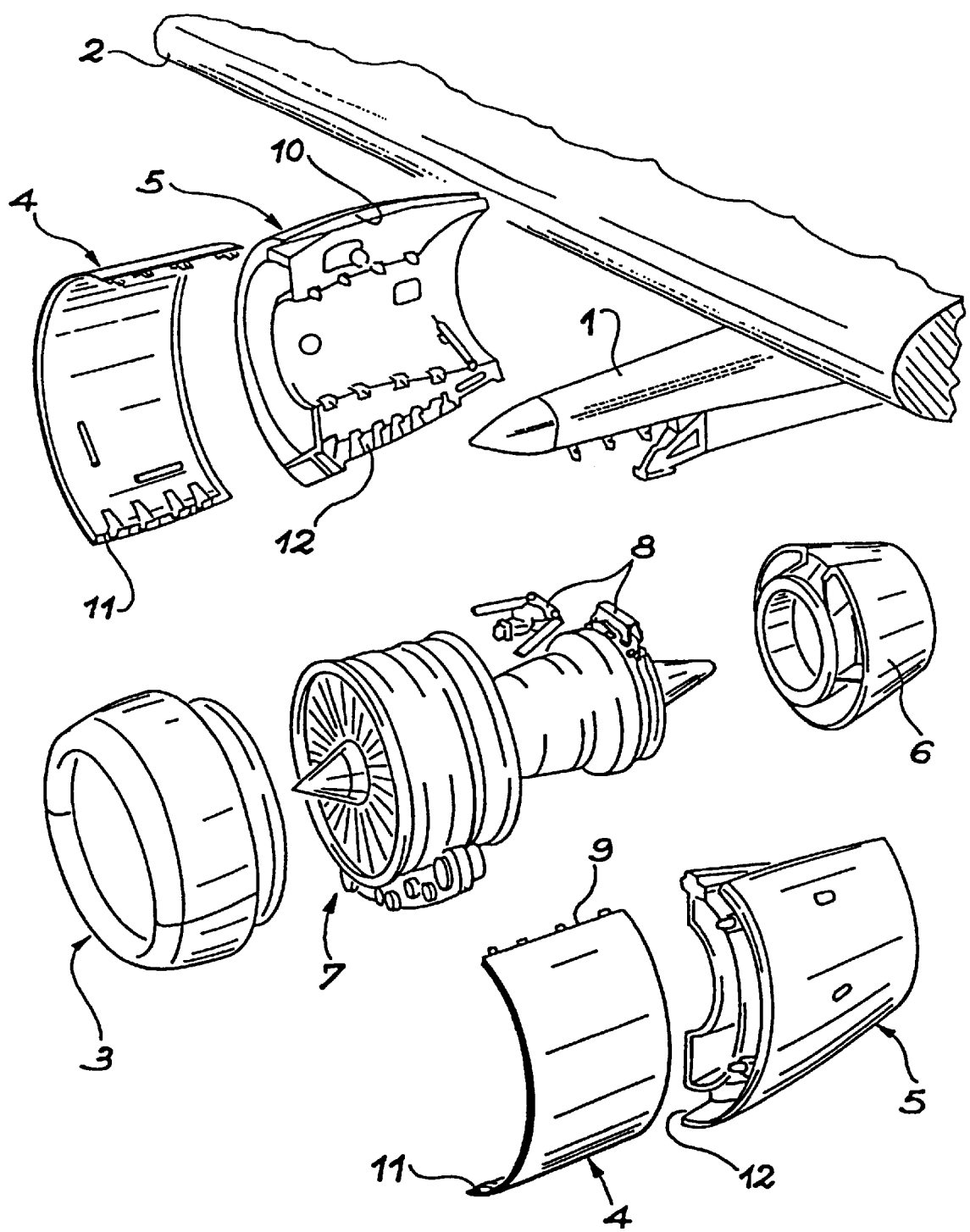
FIG._1
*(PRIOR ART)*

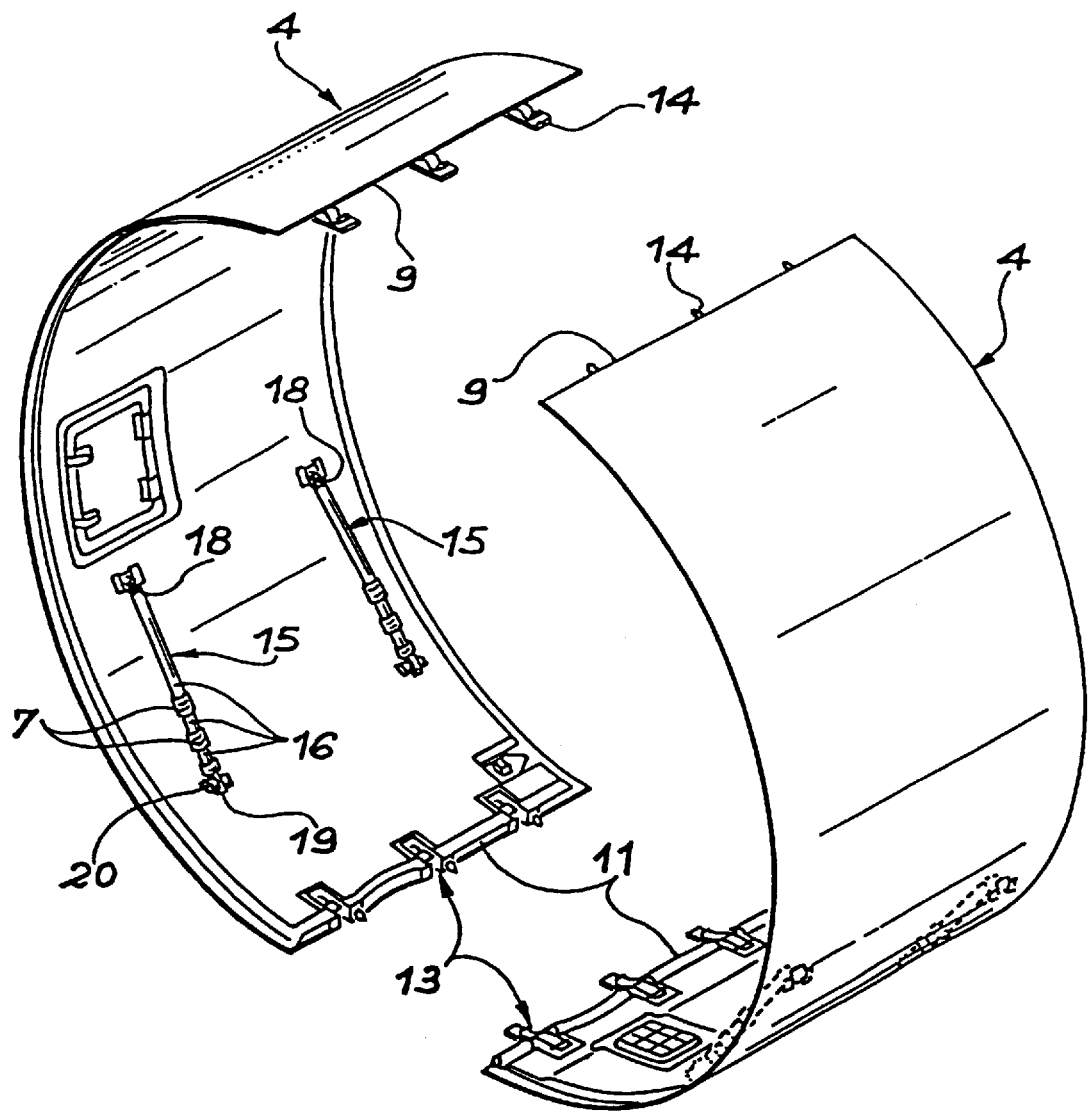
FIG._2
*(PRIOR ART)*

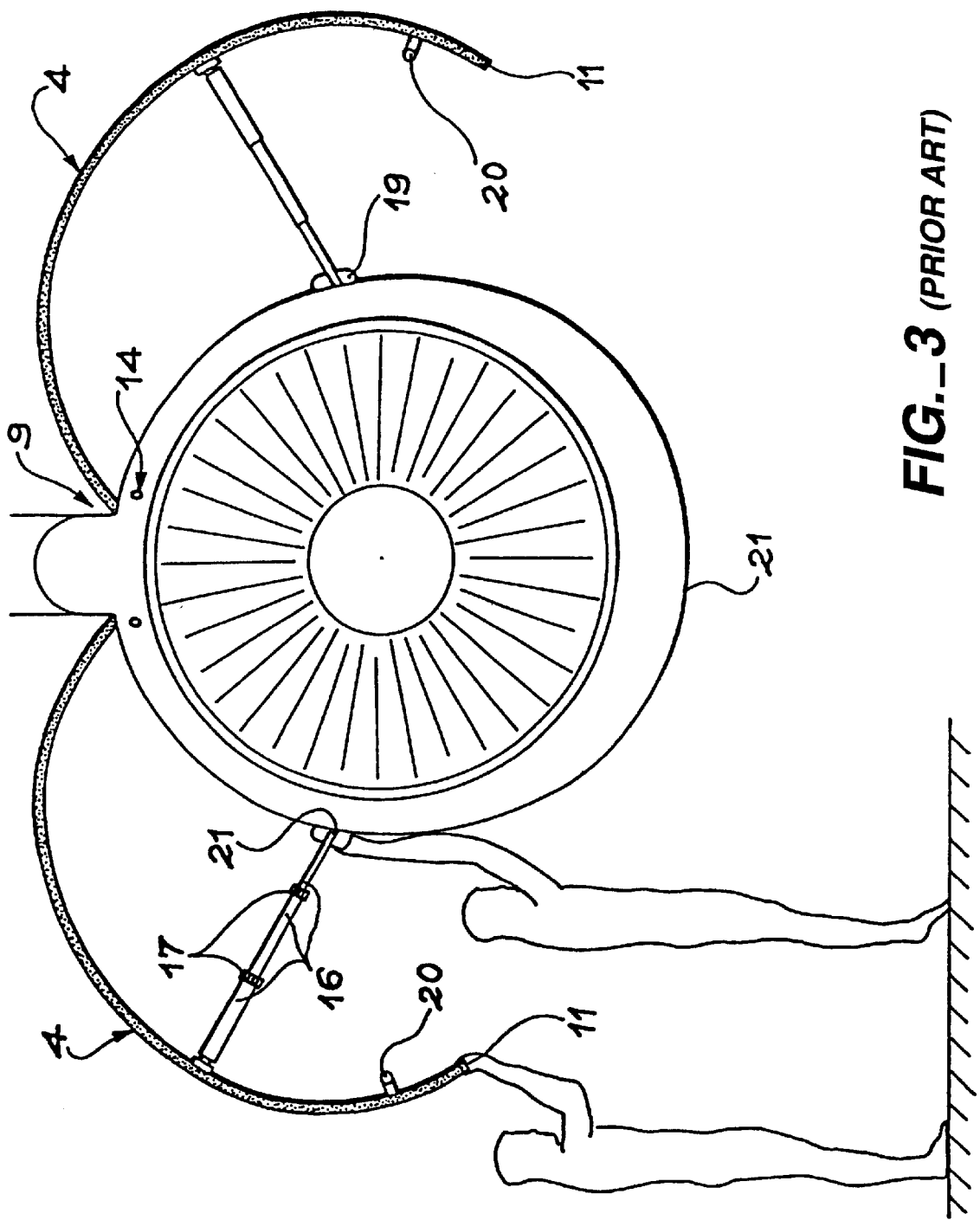
FIG._3 (PRIOR ART)

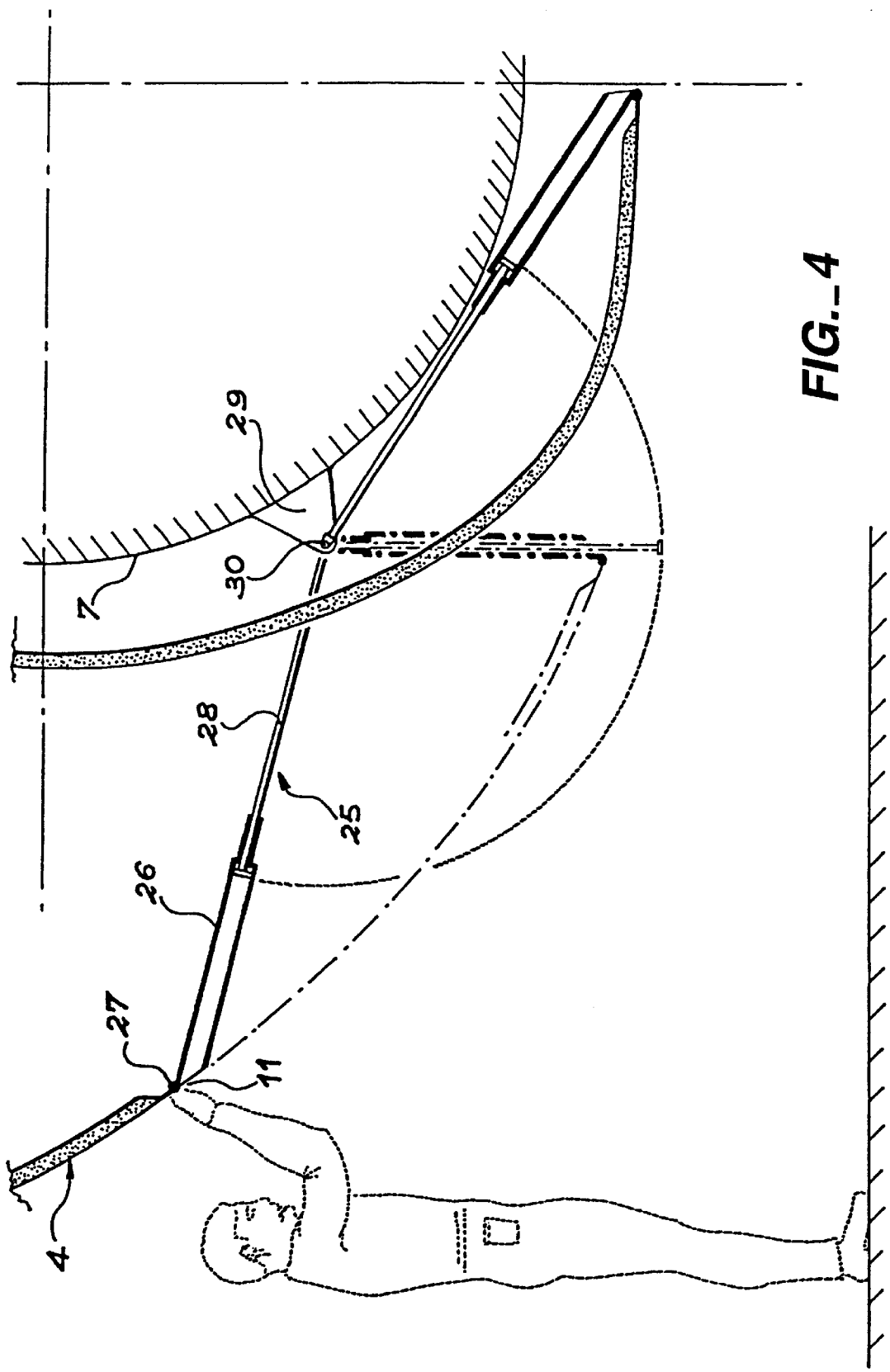
FIG._4

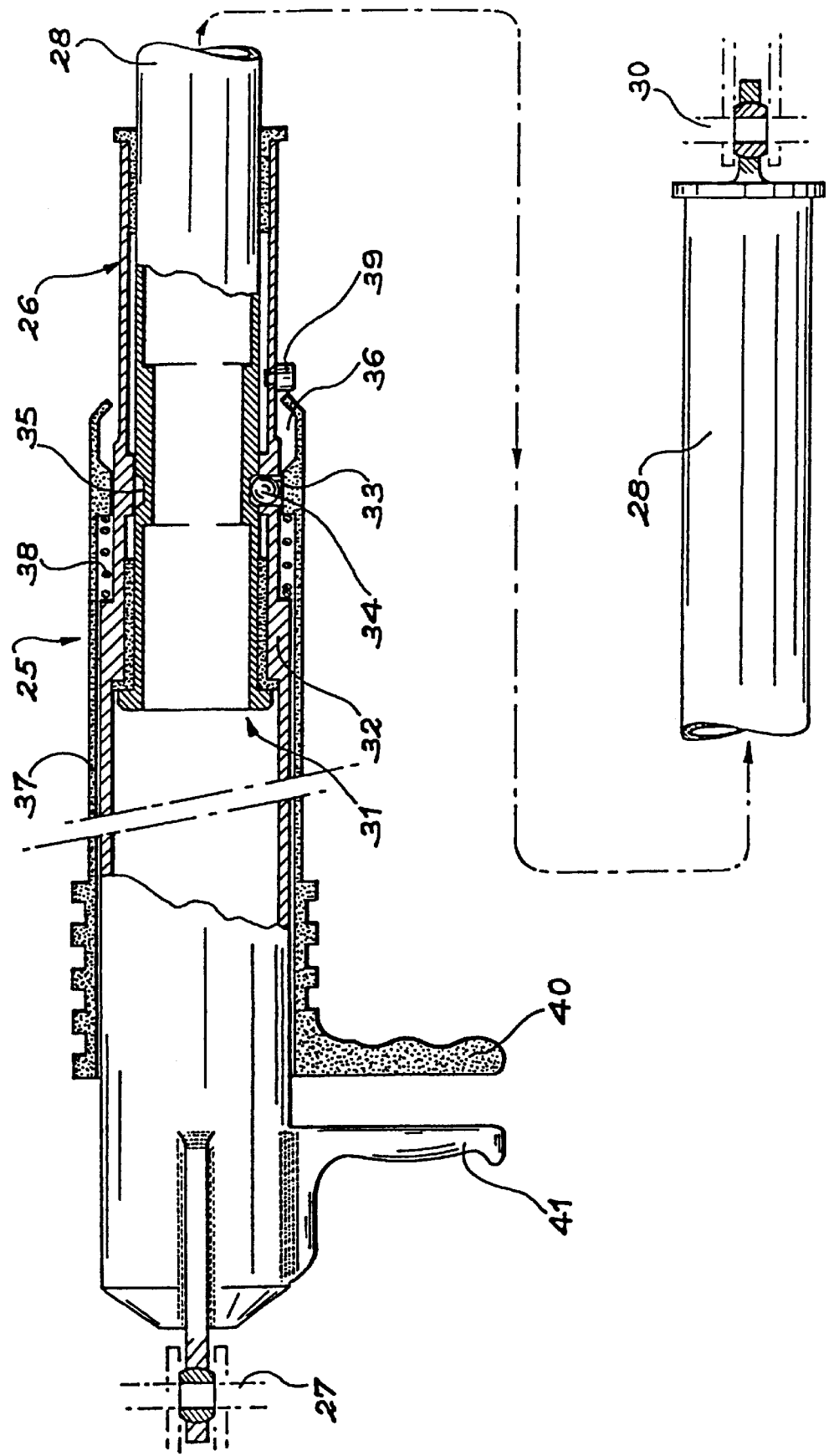
FIG._5

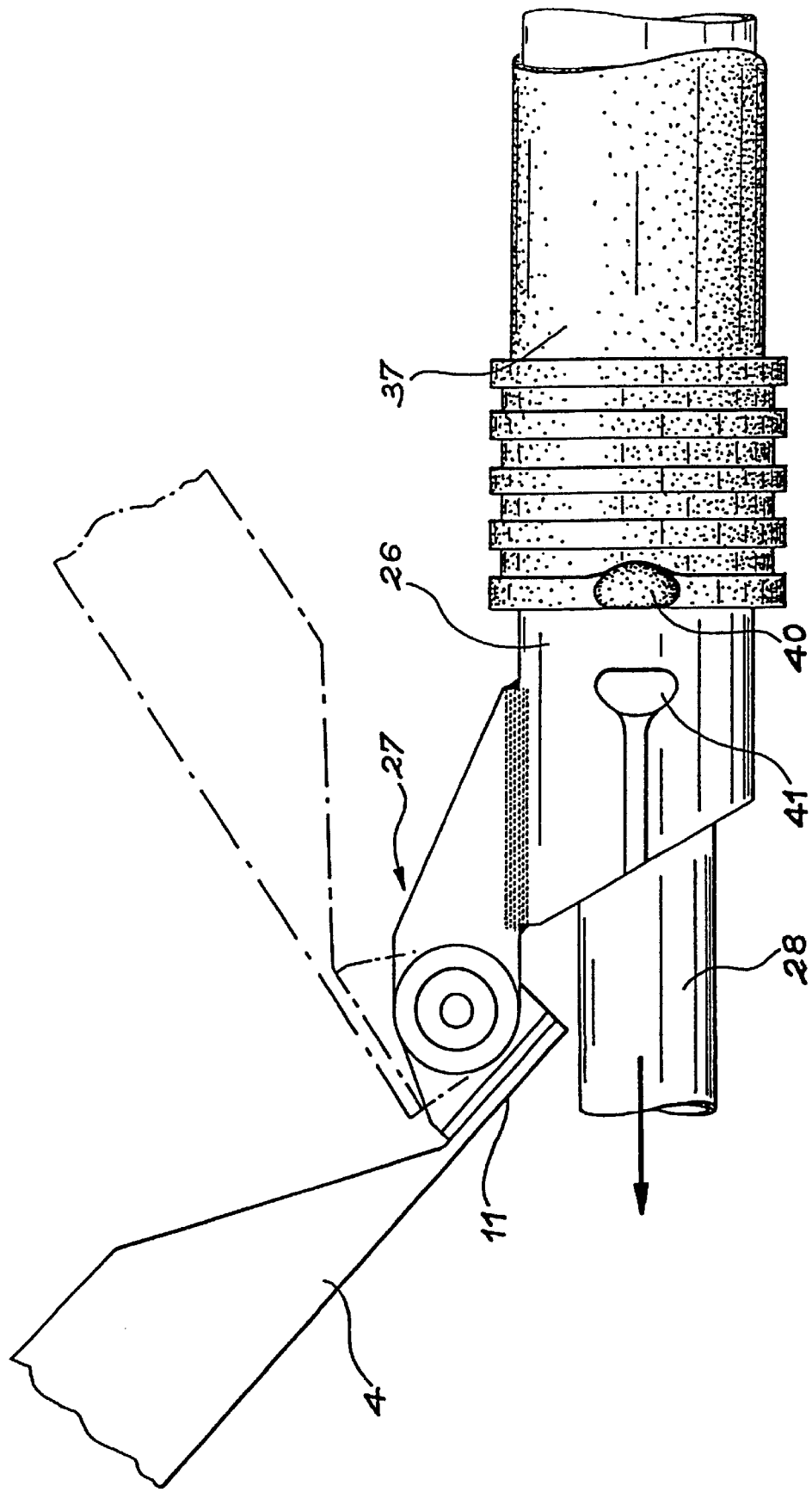
FIG._6

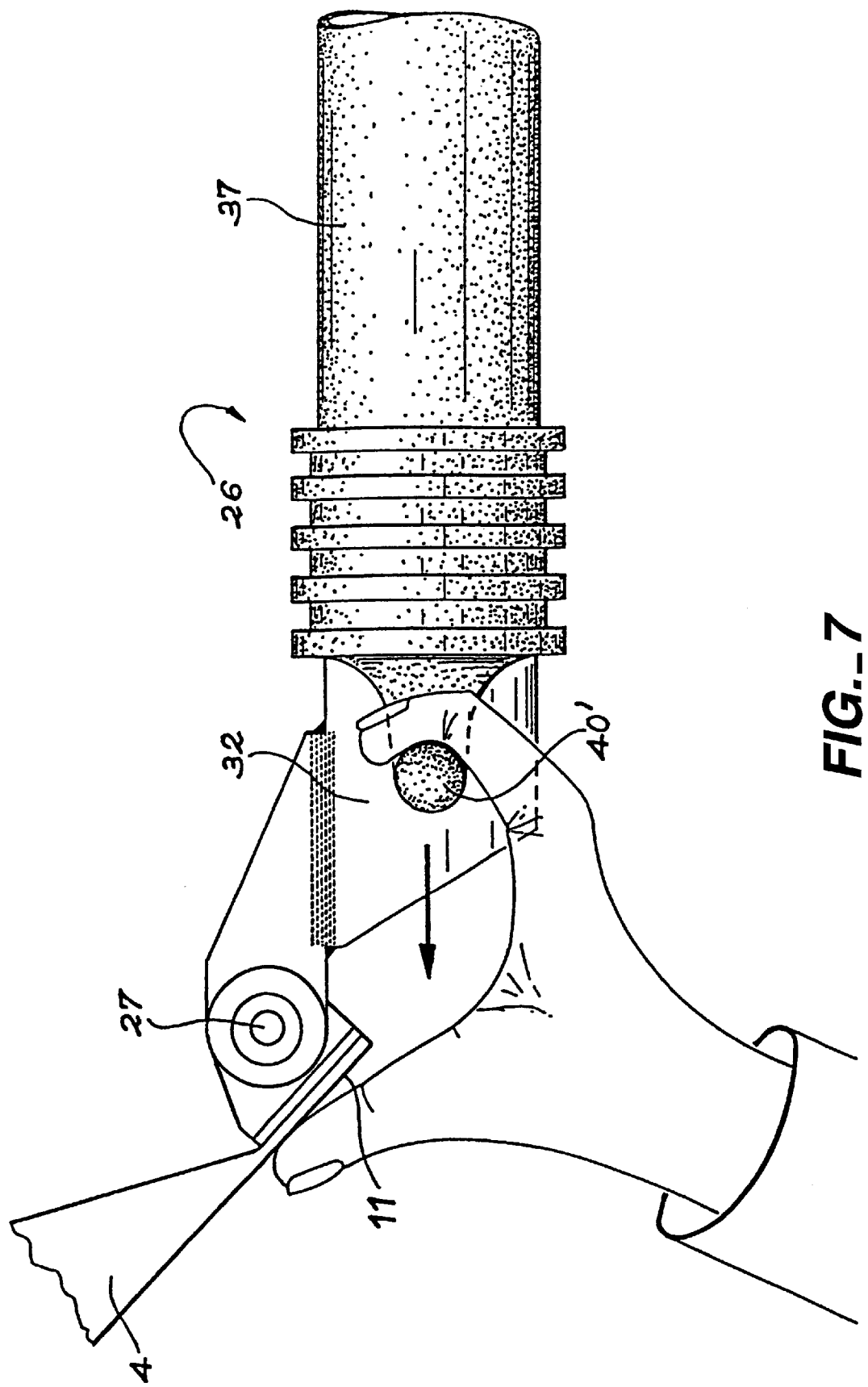
FIG._7

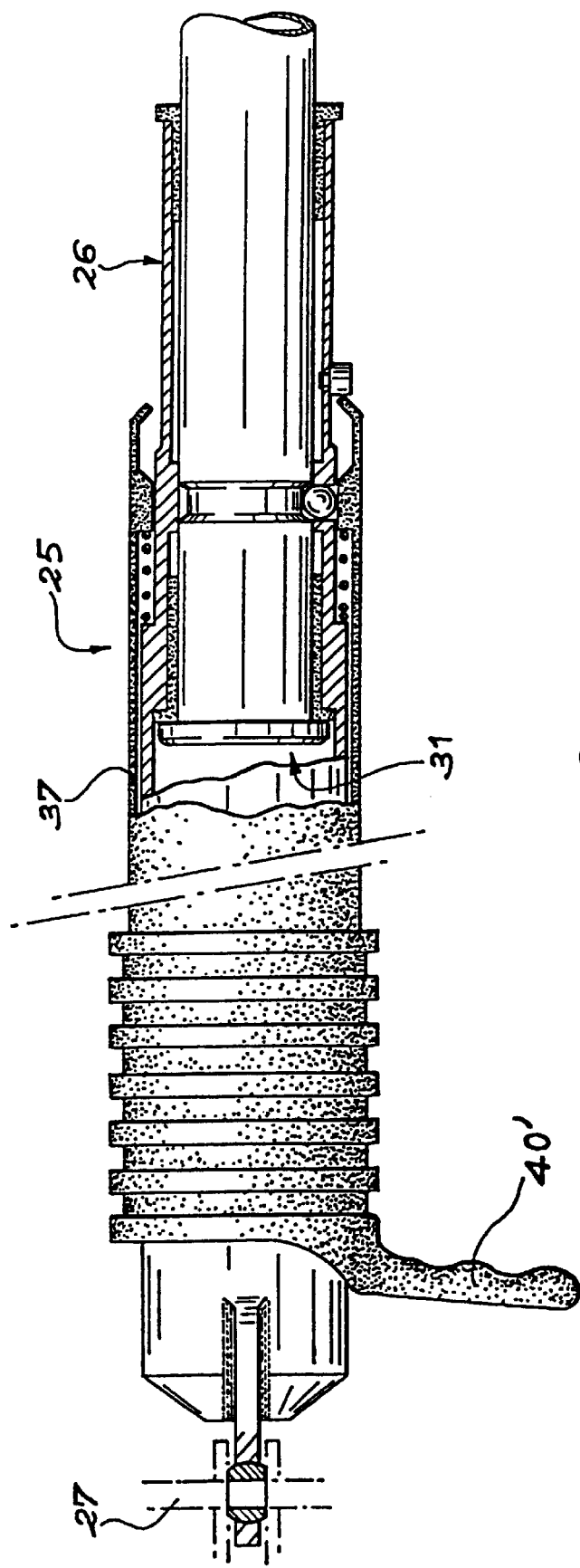
FIG._8

TELESCOPIC ROD FOR OPENING A MOBILE COWL, IN PARTICULAR OF AN AIRCRAFT ENGINE BAY

The invention relates to a telescopic bar for opening a movable cover, notably on an aircraft engine nacelle.

Aircraft engines are enclosed in nacelles, some parts of which are movable covers which can open so that access can be gained to the engine. Conventionally, these covers have cross sections in the shape of an arc of a circle, are hinged on a mast fixed to the wing by their top edge and are provided with locking means at their bottom edge so as to hold them normally closed. The opening method consists first of all of undoing the locking means and then raising the covers by hand if their weight so permits or using jacks provided for this purpose. When opening is complete, bars are installed between the cover and the now exposed engine in order to prevent the covers from falling. These bars must be telescopic, formed by sections sliding in each other and which are locked in the deployed position by controlling locking systems: they are in fact kept beforehand in the adjoining space between the cover and the engine, which is too cramped for them to be able to be left in the deployed state. In the design known up to the present time, the bars are hinged at one end on the cover, approximately half way up it, and the other end terminates in a clamp which closes on a handle on the cover when the bars are stored.

Once the cover is unlocked and raised, an operator must therefore detach the clamp on the bar from the cover handle, and then pull the bar so that its sections are deployed, mutually lock the sections when their deployment is complete and engage the clamp in a handle fixed to the engine in order to install the bar and guarantee opening of the cover. These operations are relatively slow and the operator can obviously do nothing else during this time: if the cover does not have motorised opening (which is generally the choice with lightweight covers so as not to complicate their design), it is therefore necessary to have the cover raised by at least one other operator whilst the first one takes care of the bar. The same applies when the cover is to be closed again. Using several operators for such simple operations is to be regretted.

The object of the invention is therefore to accomplish all the operations of opening a movable cover on an aircraft engine nacelle by means of a single operator by virtue of a novel design of the telescopic bar intended to hold the cover open under maximum safety conditions, including in the case of high wind (regulations of the DGAC, FAA, etc).

In its most general form, the invention thus relates to a telescopic bar for opening a movable cover on an aircraft engine nacelle, the movable cover having an edge hinged on a mast or another ※ fixed ※ part of the engine or nacelle, and a bottom edge equipped with means of locking on the nacelle or on another movable cover on the nacelle, the bar being composed of sections comprising mutually sliding first and second sections provided with locking systems able to be brought into service for an extension position of the bar in which the movable cover is held open and a single unlocking mechanism overriding the service of the locking system, characterised in that it is permanently hinged on the engine and on the bottom edge of the movable cover at opposite ends, and in that the unlocking mechanism has a handle situated close to the end articulated on the bottom edge of the movable cover.

It can be seen that the bar, permanently hinged on the cover at one end and on the engine at the other, requires no manipulation during the opening of the cover. The connection of the bar to the opening edge of the cover enables the operator lifting the cover by this opening edge to reach the bar without difficulty in order to lock it, at least if locking is manual, or to unlock it when the cover is to be closed again. A particular design of the bar in two sections of unequal length can make it possible to hinge it at the points indicated, as will be seen subsequently, whatever the shape or kinematics of opening of the cover.

The advantages of the invention cannot be achieved by systems of bars where the unlocking mechanisms are distant from the point of hinging of the bar on the cover, nor by those where the point of articulation of the bar on the cover is distant from the bottom edge of the latter. A remarkable element of the invention is that the unlocking mechanism is separate from the locking system, which is situated at the junction of the sections of the bars.

In concrete terms, it is advantageous for the section to be articulated on the opening edge of the movable cover, the first section to be hinged on the engine and to slide in the second section, and for the unlocking mechanism to comprise a tube sliding on the second section and fixed to a control handle.

A particularly advantageous locking and unlocking mechanism is obtained if the handle is situated immediately behind the movable cover, the sliding tube comprises an internal receptacle opposite the handle, the section has at a minimum one drilling passing through it at an end opposite the opening edge of the movable cover, the first section has in it an external groove at an end opposite the engine, the locking mechanism also comprises a spring disposed between the second section and the tube and moving the handle away from the cover, and balls are disposed in the drillings whilst projecting out into the receptacle or into the groove. The hinged edge and the opening edge correspond respectively to a top edge and a bottom edge in the underwing nacelle whose description follows, but the joint between the covers can be different, for example with a fuselage carrying engines (MD 90 or other, where this joint is horizontal). The invention would apply under the same conditions.

The invention will be described in more detail with the help of the following figures:

FIG. 1 is an exploded view of the nacelle,

FIG. 2 is a more detailed exploded view of a conventional turbine cover,

FIG. 3 illustrates the opening of this turbine cover,

FIG. 4 illustrates the opening of an equipped turbine cover according to the invention, FIG. 5 is a detailed view of the bar according to the invention, FIG. 6 is a detail view illustrating one face of the opening, FIG. 7 is a view of a particular embodiment of the end of the bar, and FIG. 8 is a view, similar to FIG. 5, of the particular embodiment of FIG. 7.

FIG. 1 depicts an existing nacelle for an aircraft engine. This casing is suspended from a mast 1 on an aircraft wing 2 which is merely outlined and is composed, from front to rear, of an annular air inlet 3, a pair of turbine covers 4 to left and right, a pair of thrust reverser covers 5, also to left and right, and an annular nozzle 6. The engine 7 enclosed within the nacelle is suspended from the mast 1 by two mounting members 8 at the front and rear. The turbine covers 4 and thrust reverser covers 5 are in the shape of an arc of a circle and are hinged by their top edges, respectively 9 and 10, to the remainder of the nacelle close to the mast 1, and their bottom edges 11 and 12 carry locking means which connect the turbine covers 4 together and the thrust reverser covers 5 together. These locking means are depicted schematically in FIG. 2 under the reference 13. They are not described in detail since the invention does not relate to them and they are not modified, nor are the hinges 14 for hinging the top edge 9 or 10 on the nacelle. This FIG. 2 is an exploded view of the turbine covers 4 on which the invention will be based in the particular embodiment described here, without other locating points being excluded, but the turbine covers 4 have the particularity of being lighter than the thrust reverser covers 5 and allowing a purely manual opening in which the operators must raise the covers and deal with the bars. Those which are currently used bear the reference 15; they are stored and attached solely to the cover during flight: there is a pair of them for each of the turbine covers 4, and it can be seen that they are composed of a certain number of sections 16, three for example, able to slide inside each other and connected by locking mechanisms 17 for holding them in the deployed position. The bars 15 have a top end 18 hinged on the turbine cover 4 half way up it and a bottom end 19 formed as a clamp and held in a handle 20 on the turbine cover 4. FIG. 3 depicts a final step of opening the turbine cover 4 where an operator fits the clamp 19 on a handle 21 on the engine 7 after having detached it from the handle 20 on the cover 4 and after having deployed the sections 16 and having locked them. Another operator holds the cover 4 raised.

The bar of the invention, depicted in the following FIGS. 4 and 5, bears the reference 25. It is composed of a section 26 whose distal end is connected by a hinge 27 to the bottom edge 11 of the turbine cover 4 and a section 28 whose distal end is connected to a lug 29 on the engine 7 by a hinge 30. The section 28 slides in the section 26, which is hollow over its entire length and therefore has invariable sliding surfaces for the section 28. The bar 25 is fully deployed when the turbine cover 4 is raised by the operator to the position indicated, and it is then automatically locked as indicated below. It is held in a deployment state close to locking when the turbine cover 4 is closed, and retracts at the start of opening of the turbine cover 4 as far as a state (where it is substantially vertical) where the section 28 extends in the entire length of the section 26 and projects therefrom. This particularity is made necessary in certain cases by the kinematics of opening of the turbine cover 4, which causes the bottom edge 11 to pass very close to the lug 29 and imposes a rotation almost equal to a half-turn of the bar 25. It is possible for the section 28 to project since the hinge 27 of the section 26 is designed so that the latter extends in front of the bottom edge 11 of the turbine cover 4, i.e. its direction does not intersect the cover 4, and the section 26 is open at this point. The composition of the bar 25 in only two sections 26 and 28 makes it possible to lock them automatically by means of a single mechanism whose unlocking control handle is adjacent to the hinge 27 and can therefore be gripped without difficulty by the operator. This is what is shown in FIG. 5. Deployment of the bar 25 is ensured when a ring 31 on the section 28, opposite the hinge 30, abuts against a sleeve 32 on the section 26 opposite the hinge 27. This sleeve 32 has at a minimum one drilling 33 passing through it, in which a ball 34 is housed. The ball 34, however, has a greater diameter than the depth of the drilling 33 and therefore projects therefrom: it can extend either in a groove 35 established in the section 28 or in a receptacle 36 established in a control tube 37 sliding around the section 26. This tube 37 can be continuous as far as the handle 41, as depicted, or local, in line with the locking zone, and connected to the handle 41 by any linkage system, rod, etc. In the first case, depicted in FIG. 5, the balls 34 maintain the locking between the sections 26 and 28 for a deployment position of the bar 25; the second case is obtained by causing the tube 37 to slide towards the hinge 27 in order to place the receptacle 36 in front of the drillings 33: the balls 34 then fall into this receptacle 36, leaving the groove 35, which releases the sections 26 and 28 and makes it possible to fold the bar 25.

A spring 38, compressed between the section 26 and the tube 37, tends to move the latter away from the hinge 27 and to push it onto a stop 39 on the section 26, to a position where the receptacle 36 is offset from the drillings 33, which maintains the locking. The thrust of the spring can however be overcome if the operator pulls on a handle 40 at the other end of the tube 37 (adjacent to the hinge 27) in order to control the unlocking of the bar 25. He advantageously grips both this handle 40 and a complementary handle 41 which is fixed to the section 26 and which offers a support for it.

When the bar 25 is not deployed, the balls 34 lie in the receptacle 36 and the spring 38 is held in the compressed state. The balls leave the receptacle 36, occupying the groove 35, as soon as deployment is complete, which releases the control tube 37, which the spring 38 moves as far as the stop 39. The movement of the tube 37 and handle 40, and even the noise produced at that time, help the operator to perceive that the turbine cover 4 is completely open. However, the invention can be used with a bar without automatic locking provided that its control mechanism is accessible.

If the section 28 must project from the section 26, it is essential for the handle 40 to be placed laterally on the tube of the section 26, just like the complementary handle 41, so as to leave the opening free at the end of the section 26 (FIG. 6). One advantageous arrangement consists also of disposing the handle (40' in FIGS. 7 and 8) so that the operator can grip it whilst holding the turbine cover 4 in the same hand: it is then necessary that the handle 40' be immediately adjacent to the bottom edge 11, which is a grip on the turbine cover 4, and more precisely that it be not moved away from it by more than a span; it is also recommended to remove all obstacles between them, which can result in omitting the complementary handle 40. The remainder of the bar 25 is not altered, as FIG. 8 shows.

The bar 25 allows the automatic opening of the turbine cover 4 even under difficult conditions, in the case of a high wind, for example: the task of the operator can then even be facilitated, since the wind can help opening as far as automatic locking, without any appreciable manual action being necessary.

What is claimed is:

1. An assembly for an aircraft nacelle, the assembly comprising:

an engine;

a movable cover, the movable cover including a top edge hinged on a mast or fixed element of a nacelle, and a bottom edge of the cover further including means of locking on the nacelle or on another movable cover on the nacelle; and a telescopic bar, the telescopic bar including mutually sliding first and second sections provided with a locking system able to be brought into an extension position, in which the movable cover is held open, wherein, one section of the telescopic bar is permanently hinged on a lug on the engine and the other section of the telescopic bar being permanently hinged on a bottom edge of the movable cover, the second section of the telescopic bar being fashioned with sliding surfaces for receiving the first section of the telescopic bar, and in that the second section comprises a single unlocking mechanism having a handle situated close to the end hinged on the bottom edge of the movable cover, the unlocking mechanism overriding the service of the locking system.

2. The assembly according to claim 1, wherein the first section of the telescopic bar is slidably received by the second section of the telescopic bar and the unlocking mechanism comprises a tube sliding on the second section and fixed to the handle.

3. The assembly according to claim 2, wherein the handle is situated behind the movable cover, the sliding tube comprises an internal receptacle opposite the handle, the second section has at a minimum one drilling passing through at an end opposite the bottom edge of the movable cover, the first section has an external groove at an end opposite the engine, the locking mechanism comprises a spring, wherein balls are disposed between a second section and the tube, whereby moving the handle away from the movable cover, the balls disposed in the drillings project either into the receptacle or into the groove.

4. The assembly according to claim 1, wherein the second section comprise a tubular member having open ends and being adapted to slidably receive the first section, the sections having unequal lengths so that the first section projects from the open end of the second section hinged at the bottom edge of the movable cover, when the movable cover is articulated from a closed position to an open position.

5. The assembly according to claim 4, wherein the handle is situated laterally on the second section.

6. The assembly according to claim 1, wherein the handle is adjacent the bottom edge of the movable cover.

7. The assembly according to claim 1, wherein the locking device allows an automatic locking of the movable cover.

* * * * *

UNITED STATES PATENT AND TRADEMARK OFFICE
CERTIFICATE OF CORRECTION

PATENT NO.    : 6,334,730 B1
DATED         : January 1, 2002
INVENTOR(S)   : Alain Porte It is certified that error appears in the above-identified patent and that said Letters Patent is hereby corrected as shown below:

<u>Title page,</u>
Item [86], the filing date for §§371 and 102(e) is June 21, 1999.

Signed and Sealed this

Thirteenth Day of August, 2002

*Attest:*

JAMES E. ROGAN
*Attesting Officer*     *Director of the United States Patent and Trademark Office*